No. 627,958.  
R. J. C. MITCHELL.  
ROLLER.  
(Application filed Mar. 9. 1899.)

Patented June 27, 1899.

(No Model.)

WITNESSES:

INVENTOR  
ROBERT JOHN CHADWICK MITCHELL  
BY  
Howson and Howson  
HIS ATTORNEYS

UNITED STATES PATENT OFFICE.

ROBERT J. C. MITCHELL, OF WATERFOOT, ENGLAND.

ROLLER.

SPECIFICATION forming part of Letters Patent No. 627,958, dated June 27, 1899.

Application filed March 9, 1899. Serial No. 708,389. (No model.)

*To all whom it may concern:*

Be it known that I, ROBERT JOHN CHADWICK MITCHELL, a subject of the Queen of Great Britain, residing at Waterfoot, near Manchester, in the county of Lancaster, England, have invented new and useful Improvements in or Relating to Rollers to be Used for Wringing, Scouring, Washing, and other Purposes, of which the following is a specification.

This invention relates to such rollers as are made of wood or other material and the surfaces of which are not covered and which are used for wringing, washing, and other purposes, and also to rollers as are ordinarily covered with india-rubber, and by means of this invention the cover for these rollers will be cheaper, more durable, and more efficient than india-rubber. For this purpose I propose to felt woolen or similar fibers upon a suitable cylinder or "former" to the required thickness, diameter, and hardness to form a seamless tubular cover or sleeve, which can be fastened on the roller in the usual manner and, if necessary, turned to a true cylindrical form.

Figure 1:
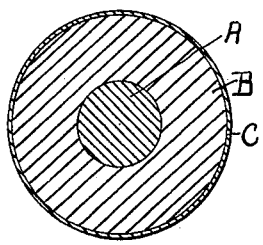
Figure 2:
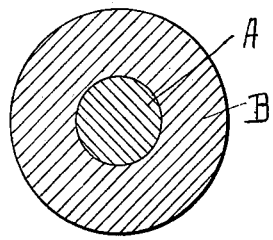

In the accompanying drawings, Figures 1 and 2 are transverse sections of rollers constructed according to my invention.

In the figures, A is the roller, and B is the seamless tubular cover or sleeve. These cylindrical felted seamless covers or sleeves may be made of the plainly felted or milled and hardened material fixed on the roller and simply turned in a lathe to a smooth cylindrical surface, which they will retain, and the fabrics will not be liable to slip on the surface during the processes of wringing, scouring, washing, or the like; but for some purposes I coat the surface thereof, as indicated at C, Fig. 1, with a waterproof varnish or solution, or I soak the same therein or otherwise so prepare the same as to render the felt entirely impervious to water and capable of being brought to a high polish, and at the same time it increases the solidity and durability of the felt without entirely destroying its elastic qualities.

By the term "milled material" I mean material which has been subjected to a fulling or felting process.

I claim as my invention—

An improved roller to be used for wringing, scouring, washing or other purposes, consisting of a roller having secured thereon a seamless tubular cover or sleeve of fabric composed of hardened, felted, or milled, fibers, adapted to be turned to a cylindrical form, substantially as described.

In testimony whereof I have signed my name to this specification in the presence of two subscribing witnesses.

ROBERT J. C. MITCHELL.

Witnesses:
GEORGE DAVIES,
JNO. HUGHES.